United States Patent [19]

Sommers

[11] 4,353,003

[45] Oct. 5, 1982

[54] SOLAR ELECTRIC GENERATOR

[76] Inventor: Dale Sommers, 3001 S. Ogden, Englewood, Colo. 80110

[21] Appl. No.: 207,376

[22] Filed: Nov. 17, 1980

[51] Int. Cl.³ .......................................... H02K 45/00
[52] U.S. Cl. ................................................. 310/306
[58] Field of Search ...................................... 310/306

[56] References Cited

U.S. PATENT DOCUMENTS

3,137,125  6/1964  Kyryluk ................................. 60/26
3,348,374  10/1967  Schalkowsky ................. 310/306 X

Primary Examiner—Donovan F. Duggan
Attorney, Agent, or Firm—Young & Martin

[57] ABSTRACT

A solar electric generator is provided wherein a plurality of propellers are mounted transversely to a shaft journaled on bearings in a housing. Each propeller includes a plurality of equiangularly spaced arms with each arm terminating in a vane member which is coated with a light absorbing medium. The housing is provided with a transparent window so that sunlight may fall on the coated side of the vanes as they rotate with the shaft mounted in the housing. The shaft is connected to a suitable electric generator such that rotation of the shaft is converted into electrical energy by the generator. A focusing system is provided to direct light along different paths to strike the absorbing surface of the vanes as they rotate about the shaft and a tracking mechanism is operative to track the sun both daily and seasonally.

18 Claims, 10 Drawing Figures

SOLAR ELECTRIC GENERATOR

BACKGROUND OF THE INVENTION

The present invention relates to an electric generator which directly converts sunlight into mechanical energy with this mechanical energy in turn being directly converted into electrical energy. In recent years, much attention has been given to the development of energy sources as alternatives to traditional depletable resources such as oil, coal or other petroleum products. Of particular interest to this attention has been to renewable energy resources, and in particular, much attention has been directed to the field of solar energy. The advantages of solar energy over existing energy conversion systems from a standpoint of reduced pollution and even ultimately from a cost standpoint are manifest.

To this end, many different systems have been designed to enable a conversion of sunlight into a more usable form of energy, and such attempts have been traditionally either a direct conversion of solar energy into electricity or a conversion of solar energy into heat such as for heating a house or for heating water. There have been, however, some attempts to directly convert solar energy into mechanical energy so that this mechanical energy may directly do work or may in turn be converted into another form of energy such as electricity.

For example, there have been attempts at converting solar energy to mechanical energy utilizing the expansion and contraction properties of metals or other materials such as shown in U.S. Pat. No. 4,055,956 issued to Matovich and U.S. Pat. No. 4,075,847 issued to Ray. There have been other attempts at converting solar energy into rotational mechanical energy utilizing either convection currents of gases such as shown in U.S. Pat. No. 3,137,125 issued to Kyryluk or systems wherein expanding gases are used to convert sunlight into rotary motion as shown in U.S. Pat. No. 3,984,985 to Lapeyre.

The present invention is a novel approach in converting sunlight directly into mechanical motion and thereafter into electrical energy. Specifically, the present invention utilizes the light reactive principle found in the common radiometer. That instrument, in common practice, consists of a paddle wheel having vanes coated on one side with a light absorbing material and on the opposite side with a light reflective material. This paddle wheel is suspended in a vacuum bubble and, when set in sunlight, the paddle wheel turns in response to incident sunlight. Heretofore, radiometers have been used either as novelty items or as an aparatus for measuring light such as disclosed in U.S. Pat. No. 1,000,831 to Martin. One system incorporating a laser to drive a standard radiometer in an attempt to generate electricity is shown in Great Britain Pat. No. 1,395,137 issued to Pedric.

Despite the various solar generator systems that have been developed, there is still a need for useful technologies which convert solar energy into electrical energy and which are economical to operate and maintain.

SUMMARY OF THE INVENTION

It is an object of the present invention to provide a system that converts sunlight to electricity which system is both economical to operate and easy to maintain.

It is another object of the present invention to provide a mechanical system that reacts to sunlight to convert solar energy into mechanical energy which mechanical energy may be directly applied to do work or which may be converted to other useful forms of energy.

It is still a further object of the present invention to utilize the principles of a radiometer to generate electricity from the energy of incident sunlight and to convert this solar energy into mechanical motion which thereafter is converted into electrical energy.

Yet another object of the present invention is to provide a mechanical system for converting sunlight into more readily usable energy and which includes an optical system for increasing the amount of incident sunlight available for utilization by the mechanical system.

It is still a further object of the present invention to provide a mechanical system that reacts to incident sunlight to convert the energy of that light into electrical energy and which system is adapted to be adjustable to both seasonal and daily tracking of the sun.

The present invention is an electric generator which directly converts sunlight into mechanical energy and which then utilizes this mechanical energy to generate electricity. To accomplish this, at least one propeller, but preferably four propellers, are mounted transversly on a shaft which is supported by low friction bearings in an evacuated housing. The propellers have vanes mounted on their outward ends with at least one surface of these vanes being coated with a light absorbing material. The housing includes a window which allows light to strike the vanes mounted on the propeller arms so that this incident sunlight turns the shaft mounting the propellers. This motion is then converted into a more useful form of energy, such as electricity, by means of a standard electric generator including a magnet mounted on the end of the shaft which is rotated in a conducting coil. In the preferred embodiment of the invention, it is also desired that the device include a optical lensing system which allows the concentration of sunlight utilized by the apparatus and a tracking mechanism enabling the apparatus to track the course of the sun.

As noted, it is preferable to have more than one propeller mounted on the shaft and, in the preferred embodiment, four such propellers are provided each of which having four arms spaced 90 degrees apart around the shaft. The arms of adjacent propellers are offset with respect to one another approximately 22.5 degrees so that the arms of the propellers are uniformly staggered about the shaft. Thus, a more constant torque is provided about the shaft due to the effect of the incident sunlight.

Also, it is desired that an optical system be provided such that sunlight is directed on the propeller and shaft assembly from more than one direction to enhance the effect of the incident sunlight in creating torque about the device. To this end, a lens and mirror focusing system is provided to direct additional sunlight along the path such that sunlight impinges the propeller assembly from generally opposite directions angularly offset about the shaft, with the sunlight always falling on the coated surface of the vanes. Further, the tracking mechanism may include an observatory type gear which permits the tracking of the course of the sun during the day. As an alternative tracking system, a freon actuated hydraulic assembly may be used to cause the solar electric generator to follow the sun's course automatically. Additionally, a means may be provided to adjust the path of light falling on the device to accommodate seasonal changes in the sun's attitude in the sky or the apparatus may be mounted at an adjustable angle to maximize the effect of the sun's rays.

These and other objects, advantages, and capabilities of the present invention will become more readily appreciated and understood when taken together with the following detailed description, in conjunction with the accompanying drawings.

DETAILED DESCRIPTION OF THE PREFERRED EMBODIMENT

Figure 1:
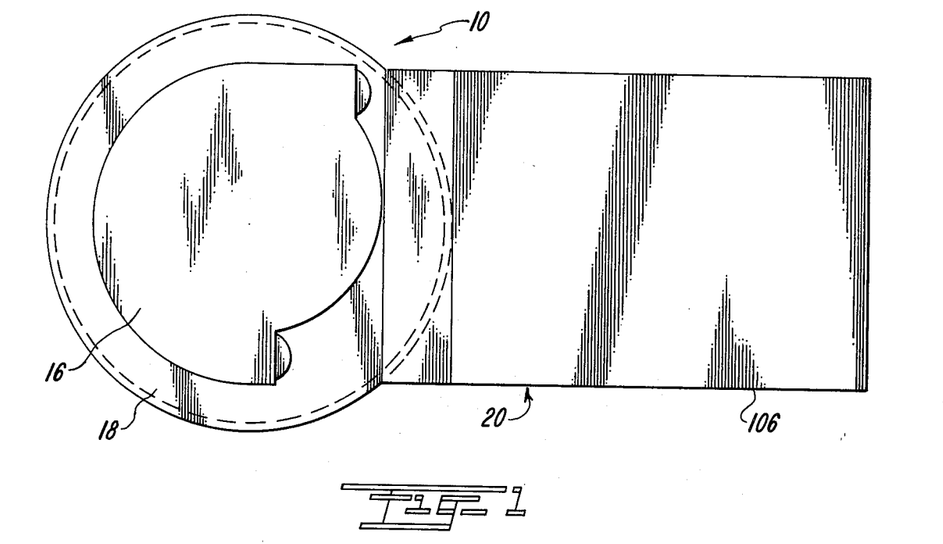
FIG. 1 is top plan view of the solar electric generator according to the present invention.
Figure 2:
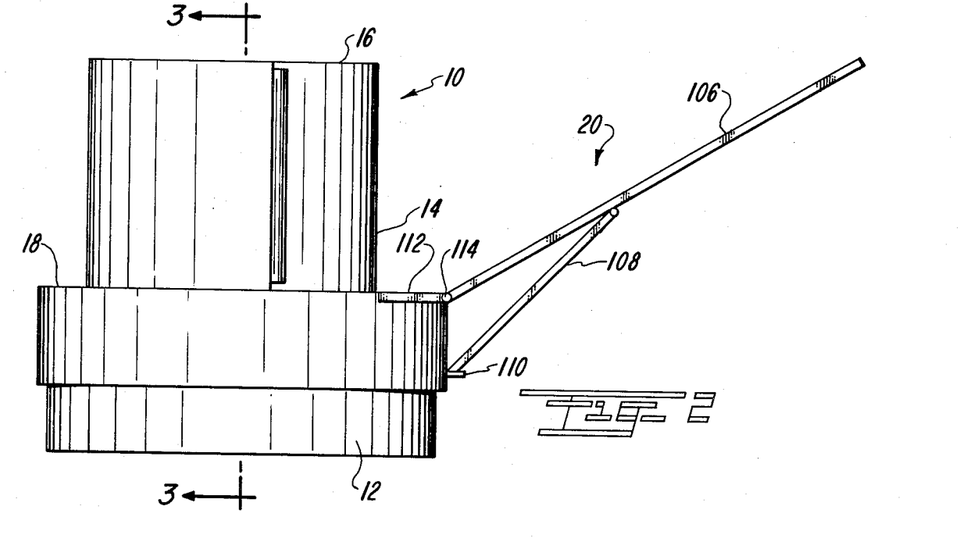
FIG. 2 is a side view in elevation of the solar electric generator according to the preferred embodiment of the present invention.

The present invention, in the preferred embodiment, comprises a solar electric generator which has a means for converting the energy contained in sunlight into mechanical energy and, subsequently, into a more useful form of energy such as electricity. It should be appreciated however, that the mechanical energy could be directly utilized if desired. The mechanism accomplishing this conversion shown in FIGS. 1, 2 and 3. Specifically, solar electric generator 10 as shown in these figures is positioned upon a suitable terrain. Solar electric generator 10 includes a stationary base 12 upon which a housng 14 is rotatably positioned. Housing 14 is formed in a generally bell-shape, having a main body 16 and a surrounding shoulder 18 which is positioned upon base 12. A mirror assembly 20 is supported by shoulder 18 of housing 14 in a cantilever manner with mirror assembly 20 being discussed in greater detail below.

Figure 3:
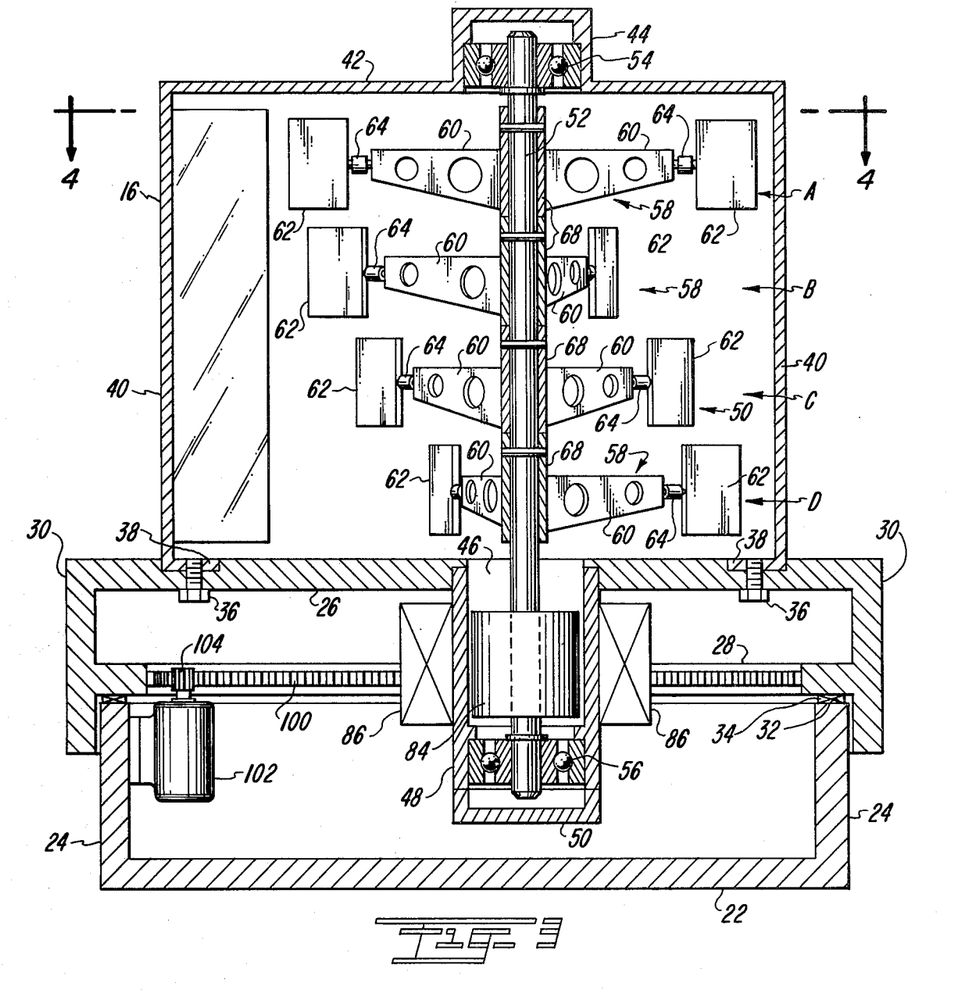
FIG. 3 is a cross-sectional view of the solar electric generator according to the present invention taken about lines 3—3 of FIG. 3.
Figure 4:
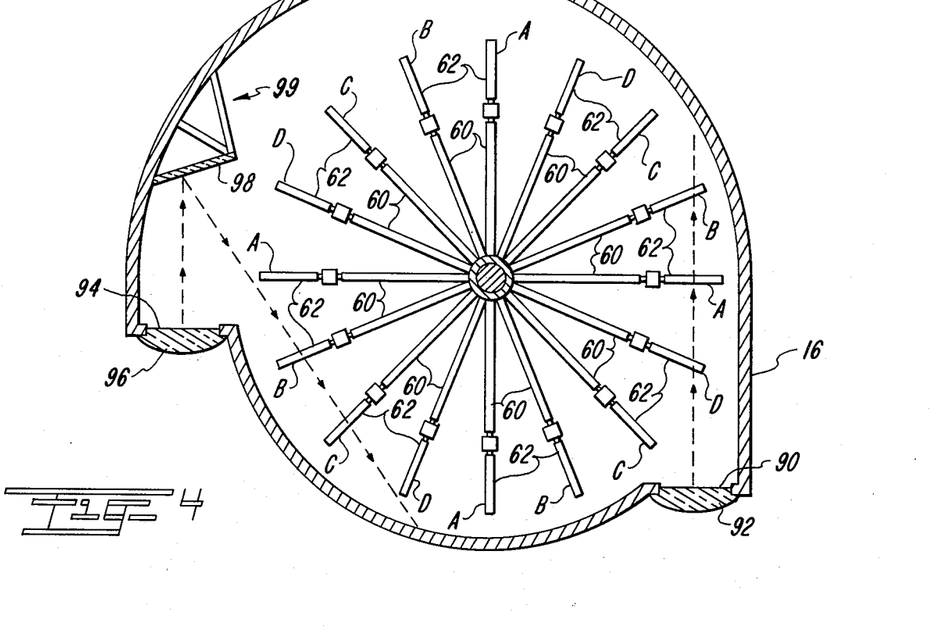
FIG. 4 is a cross-sectional view of the solar electric generator according to the present invention taken about lines 4—4 of FIG. 3.

The structure and mounting of the elements of solar electric generator 10 is shown in greater detail in FIGS. 3 and 4. Base 12 is formed as a generally cylindrical support having a closed end 22 and a cylindrical sidewall 24 extending upwardly therefrom and terminating in an open end. Base 18 is also formed as a cylinder, having a slightly larger diameter than the diameter of base support 12. Base 18 has a closed end wall 26 upon which is mounted main body 16. The open end of base 18 telescopically receives the open end of base support 12. A radially inwardly projecting shoulder 28 is formed along the interior surrounding sidewall 30 of base 18 so that shoulder 28 prevents base support 12 and base 18 from collapsing together. To this end, shoulder 28 is positioned on the upper edge 32 of sidewall 24 and is mounted by means of a suitable bearing 34 which allows relatively free rotation of base 18 on base support 12. Bearing 34 may extend entirely around upper edge 32 in the preferred embodiment of the present invention, although it should be understood that any suitable low friction bearing means such as appropriately spaced ball bearings would be appropriate to mount base 18 on base support 12.

Main body 16 is secured in any convenient manner to end wall 26, and in the present embodiment is so mounted by means of a plurality of bolts 36 which secure a radially inwardly projecting wing 38 of main body 16 to end wall 26. It should be noted that it is important that this mounting be vacuum tight since main body 10 is evacuated for operation of the solar electric generator according to the present invention. Main body 16 is generally cylindrical and has an upstanding sidewall 40 and a closed end wall 42 opposite wing 38. End wall 42 includes a hollow nose portion 44 located centrally thereof which receives mounting structure for the solar reactive mechanism of the solar electric generator. End wall 26 of base 18 has a central opening 46 within which is mounted a cylindrically shaped bracket 48 which projects downwardly from end wall 26 and which terminates in a flat end wall 50. Since main body 12 of the solar electric generator is to be evacuated, it is necessary that the seal between cylindrical bracket 48 and end wall 26 be air tight.

Nose portion 44 and cylindrical bracket 48 are axially aligned with one another with this axis lying in a vertical direction when base support 12 is placed on a horizontal support surface. An elongated shaft 52 is oriented on this vertical axis and is rotatably journaled between low friction bearings 54 and 56 respectively mounted in nose 42 and cylindrical support bracket 48. The structure of the shaft support can be adapted from the shown in FIG. 3 to accommodate a conic bearing having tapered roller bearings mounted on a stepped shaft. Alternately, magnetic bearings may be utilized to mount shaft 52. Shaft 52 supports a plurality of propellers 58, and in the preferred embodiment, four such propellers are mounted on shaft 52 and are labeled A, B, C, and D in FIG. 4. Further, each propeller includes a plurality of radially outwardly projecting arms 60, and, while the number of arms 60 on each propeller 58 may be varied, in the preferred embodiment, four arms 60 are mounted on each propeller 58 and are axially spaced apart from one another 90 degrees therearound. The arms of adjacent propellers 58 are equiangularly offset from one another about shaft 52. That is, the arms 60 of propeller A are offset 22.5 degrees from those of propellers B and D, and arms 60 of propeller C are also offset 22.5 degrees from B and D and 45 degrees from those of propeller A.

Each of arms 60 support, at its outward end, a vane 62 which is preferably mounted to each arm 60 by means of a servo motor 64. Each servo motor 64 is securely attached to arms 60 with its output shaft 66 supporting a vane 62 such that rotation of each shaft 66 causes a respective vane 62 to pivot about the longitudinal axis of arm 60.

Figure 5:
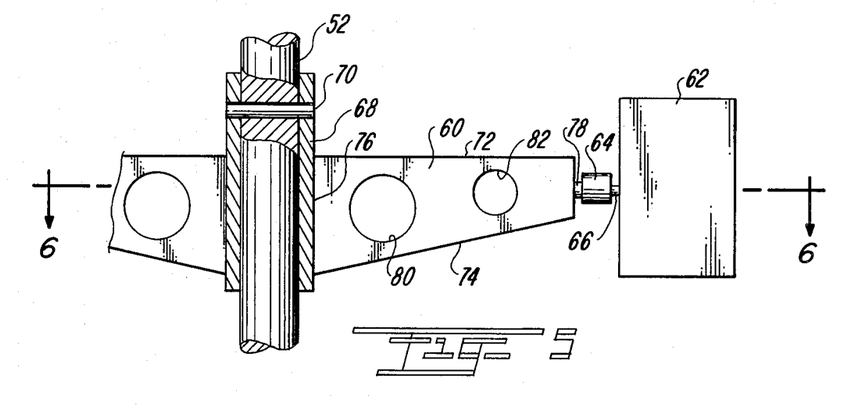
FIG. 5 is a side view in elevation of a propeller arm forming a part of the present invention and shown with its attachment to the propeller shaft in partial cross-section.
Figure 6:
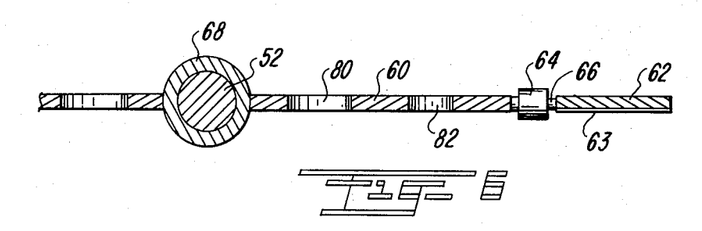
FIG. 6 is a cross-sectional view of the propeller arm shown in FIG. 5 taken about lines 6—6 thereof.

Each arm 60 is secured to shaft 52 of the solar electric generator, and, as shown in FIGS. 5 and 6, such attachment is preferably accomplished by means of a sleeve 68 which telescopically engages shaft 52. A pin 70 passes through sleeve 68 and shaft 52 through bores formed therein so that sleeve 68 may not rotate relative to shaft 52. Arm 60 may be welded to sleeve 68 or otherwise attached thereto in any convenient manner known in the art. It is only necessary that arm 60 be rigid with respect to sleeve 68. Further, as shown in FIGS. 5 and 6, arms 60 are formed generally as a trapezoid having a substantially horizontal top edge 72 and a slanted bottom edge 74 with generally vertical side edges 76 and 78, edge 76 being longer than side edge 78. Servo motor 64 is then mounted to side edge 78. In order to reduce weight, a pair of circular cutouts or holes 80 and 82 are formed in the main body of each arm 60 with hole 80 being somewhat larger than hole 82. As shown in FIG. 3, the plurality of propellers 58 are mounted on shaft 52 in stacked relation to one another such that sleeves 68 are in vertically abutting relation. Since all of the propellers 58 are secured to shaft 52 the entire shaft and propeller assembly is mounted for common rotation about the longitudinal axis of shaft 52.

A magnet 84 is mounted at a lower end of shaft 52 adjacent bearing 56, with magnet 84 being positioned internally of cylindrical bracket 48. An electromagnetic coil 86 is in a generally common plane with magnet 48. Electromagnetic coil 86 is in turn connected to any suitable electrical output posts (not shown) as is known in the art. These output posts are positioned at any convenient location about the non-movable housing of the solar electric generator, and may be conveniently positioned anywhere along sidewall 24. Suitable electrical connection is made between electromagnetic coil 86 and the output posts. The coil and motor then convert rotational motion of shaft 52 into electrical energy. Should direct use of this mechanism energy be desired however, the rotational motion of shaft 52 could be coupled to any suitable mechanical output.

As noted above, each vane 62 has at least one side with an absorptive coating 63 formed on one side thereof, although both sides may be so coated. When incident sunlight falls on coating 63, the light is absorbed and a torque is generated about shaft 52 in a manner similar to the standard radiometer. Accordingly, it is necessary that there be a suitable optical path formed to allow light to strike vanes 62 in a zone wherein the incident light strike the vanes at angles approximately 90 degrees.

Preferably, two optical paths are provided so that the light will fall on each vane 62 twice during its period of rotation about shaft 52 as it passes through two arc-shaped zones axially spaced from one another about shaft 52, with the zones preferably being angularly offset more than 90 degrees. These two paths are shown in FIGS. 3 and 4. In the first of these paths, light may enter an opening 90 formed in the sidewall of the solar electric generator. Opening 90 is formed as a slot extending vertically along main body 16 for substantially its height, and is sealed by means of an achromatic lens 92, also extending vertically of main body 16. Lens 92 is sealed against opening 90 by means of any convenient gasket (not shown) such that it is air tight. This light is focused by means of lens 92 so that it directly falls on each of vanes 62 as it passes through this arced portion of its path. Lens 92 is positioned and is of such focal length so that this optical path impinges on vanes 62 at angles approximating 90 degrees such that the effective torque generating force resulting from the impact of light on the vanes 62 is maximized. Specifically, light entering through 92 and opening 90 defines an optical path that is perpendicular to arm A. of FIG. 4.

The second optical path is formed by the light entering opening 94 through acromatic lens 96. Specifically, an opening 94 is formed in main body 16 and a lens 96 is positioned over this opening 94. In a manner similar to that described with respect to lens 92 and opening 90, lens 96 provides an air tight seal for opening 94 in any convenient manner. In this case, of this second optical path, the light is first directed to a mirror 98 which is mounted to housing 16 by means of any convenient framework 99. The light is then reflected back onto vanes 62. Vanes 62 pass through the light reflected from mirror 98 with this light following a path such that it is substantially perpendicular to arms 60 when their associated vanes 62 are in the beam of light. This again maximizes the torque created about shaft 52. It should be noted that, since propellers 58 rotate around the axis of shaft 52, the light from the two optical paths actually fall on the same side of vanes 62 although the effective zones for each path is axially offset from one another, preferably more than 90 degrees. Thus, it is only necessary that that side of vane 62 be coated with an absorbtive material although it may be more convenient from a manufacturing standpoint to coat both sides of vane 62 with an absorbing material. Preferably, this material is chromium dioxide, although other suitable materials as is known in the art may be used as well.

In order to enhance the operation of the device, two mechanisms are provided to help follow the sun's path, both daily and seasonally. In order to track the sun's course in the sky on a daily basis, an observatory type gear is mounted between base support 12 and base 18. As is shown in FIG. 3, an observatory gear is attached to the interior edge of shoulder 28 of base 18. A motor 102 is mounted to sidewall 24 of base support 12 with the gear shaft 104 of motor 102 engaging gear 100. Motor 102 is selected to have a gear ratio that allows gear shaft 102 to slowly drive base 18 at a rate corresponding to the earth's rotation so that, once set, openings 90 and 94 always directly face the sun regardless of the time of day. Accordingly, it is only necessary that gear 100 extend around the interior of shoulder 28 a sufficient distance to allow this tracking since motor 102 may be reversed at sunset to return openings 90 and 94 to an orientation so they may face the sun at sunrise the next day. Since the daylight hours are longer in the summer, it is necessary that this gear be more than 180 degrees of arc although it is not necessary that it extend completely around the interior edge of shoulder 28.

The second tracking mechanism relates to a seasonal tracking and, in the embodiment of the apparatus shown in FIGS. 1-6, comprises a mirror assembly 20 which is secured to base 18 in a cantilever manner. Specifically, mirror assembly 20 includes a mirror 106 mounted in any suitable bracket with this bracket being supported by cantilever member 108 which is in turn secured and supported by a bracket 110 mounted to base 18. The bracket support for mirror 106 includes a flattened portion 112 which is secured to the flat upper end wall 26 of base 18. It is necessary that mirror 106 be pivotal with respect to flattened portion 112, such as by hinge 114, with cantilever member 108 being attached to mirror 106 in such manner to adjustably support a selected pivotal relationship. The exact nature of this support assembly is not essential for the scope of this invention since it is only important to have a mirror which may be adjustably supported at different positions about hinge 114, so that no structure need further be discussed. The purpose of pivoting mirror 106 is so that sunlight which falls on mirror 106 may be reflected perpendicularly onto openings 90 and 94 and thus onto vanes 62 so that the effect of sunlight passing into the solar electric generator 10 is maximized. Mirror 106 thus provides a seasonal adjustment since it is well known that the sun's elevational angle in the sky varies from season to season so that the positioning of mirror 106 allows the sunlight to be reflected in this perpendicular relationship.

From the above, it should be appreciated that mirror 106 is positioned to maximize the incident sunlight passing through lens 92 and 96 and openings 90 and 94 to interact with vanes 62. Further, openings 90 and 94 are positioned so that they face the sun at sunrise with motor 102 driving gear 100 to turn base 18 at a rate corresponding to the travel of the sun through the sky from sunrise to sunset. Thus, openings 90 and 94 always directly face the sun. Since mirror 106 is secured to base 18, its path varies in accordance with the path of the sun on a daily basis to always reflect sunlight at a nearly perpendicular direction to vane 62. Lens 92 and 96 focus sunlight onto vane 62, and, when vane 62 absorb the light a torque is generated through propeller arms 60 to turn shaft 52 in a counter-clockwise direction as is shown in FIG. 4. This motion may then be converted by means of magnet 84 and coil 86 into electrical energy which may then be transmitted to a desired location. To maximize the torque generated by the propeller and shaft assembly, housing 16 of solar electric generator 10 is evacuated, preferably to a pressure of 35 millionths atmosphere.

Servo motors 64 also provide adjustable means to intercept incident sunlight. Specifically, suitable circuitry (not shown) is provided to activate servo motors 64 so that they pivot respective vanes 62 into planes perpendicular to the incident light, thus increasing the effect cross-section of usable radiation. While the specific electrical system is not shown, it is believed to be entirely within the scope of ordinary wiring and electrical control technology.

Figure 7:
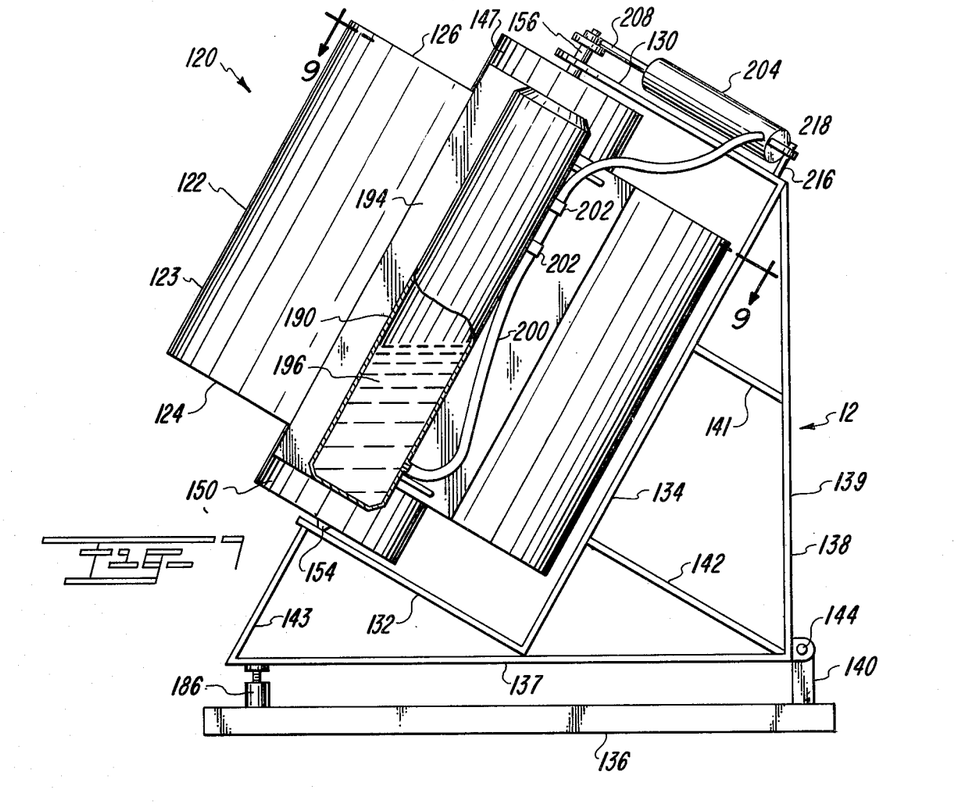
FIG. 7 is a side elevational view of an alternate embodiment of the solar electric generator and support structure.

An alternate embodiment of the present invention is shown in FIGS. 7-10 and consists of a solar electric generator 120 which has an internal construction quite similar to that of solar electric generator 10, although its housing is of a somewhat different construction and support. Further, solar electric generator 120 has a self-activated assembly to track the sun during its course through the sky. As is shown in FIG. 7, solar electric generator 120 includes a main generally cylindrical housing 122 which has a flat bottom wall 124 and a flat top wall 126.

Housing 122 is mounted by means of a bracket assembly 128 which includes a pair of spaced-apart parallel bracket arms 130 and 132 which are interconnected by means of a bracket member 134. Bracket arms 130 and 132 as well as bracket member 134 are supported to a base 136 by means of an L-shaped bracket 138 having arms 137 and 139 and which is pivotally connected at its corner to a post member 140. Frame members 141, 142, and 143 interconnect L-shaped bracket 138 with arms 130, 132, and bracket member 134. Specifically, frame member 143 is connected to the outer end of arm 137 of L bracket 138 so that it rigidly supports arm 132. Frame member 142 interconnectes a mid-portion of arm 139 of L bracket 138 to a mid-portion of bracket member 134 while frame member 142 interconnects the corner of L bracket 138 with a lower portion of bracket member 134 to rigidly support bracket 134. L bracket 138 is pivotally connected to post 140 at its corner by means of a hinge member 144.

Housing 122 is pivotally mounted between arms 132 and 130. In the alternate embodiment of the present invention, housing 122 includes oppositely projecting cylindrical noses 147 and 150, with nose 147 being attached to top wall 126 and with nose 150 being attached to bottom wall 124. Nose 150 has a sidewall 151 and an end wall 152 with end wall 152 being supported by arm 132 by means of a standard pivot gimbal 154. Nose 147 has a sidewall 148 and a flat end wall 149 with end wall 149 supporting an upright post 156 centrally thereof. Post 156 is rotatably received by a bearing 146 mounted in arm 130 so that post 156 may freely turn.

Figure 9:
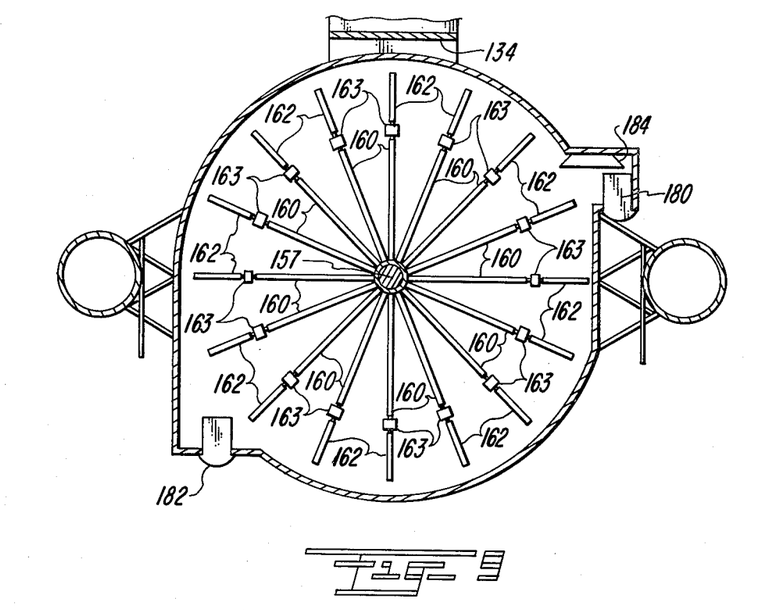
FIG. 9 is a cross-sectional view taken about lines 9—9 of FIG. 7.
Figure 10:
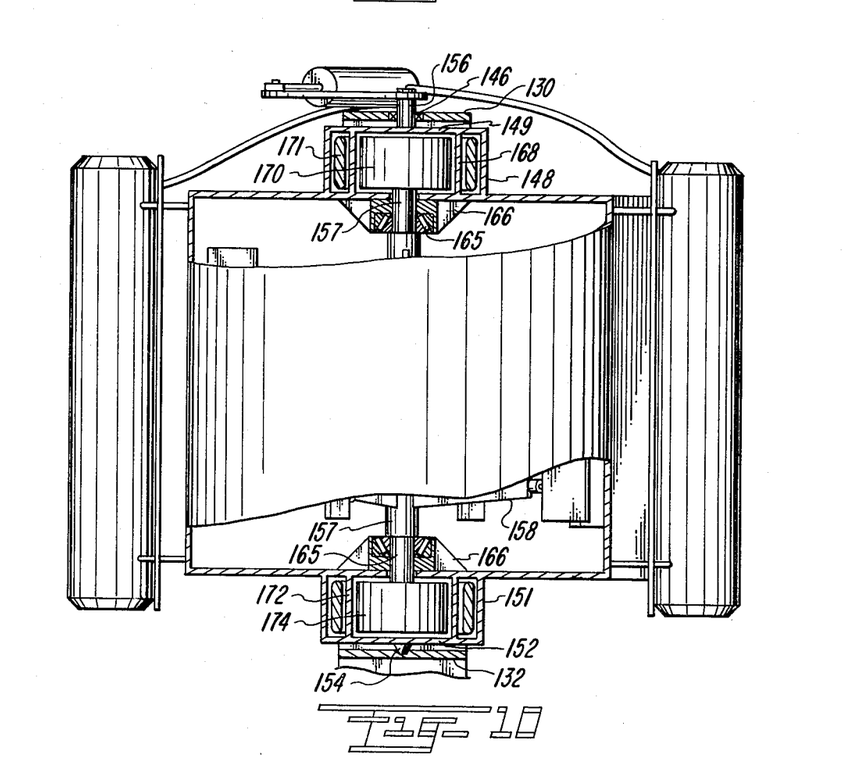
FIG. 10 is a partially broken away front elevational view of the solar electric generator shown in FIG. 7.

As noted, the internal construction of solar electric generator 120 is somewhat similar to that described with respect to the preferred embodiment of the present invention and includes a shaft 157 to which is attached a plurality of propellers 158. Propellers 158 each contain four arms 160 with a vane 162 being mounted on the outward end of each arm 160 by means of a servo motor 163, as is shown in FIG. 9. Shaft 157 is supported at opposite ends by low friction conic roller bearings 165 so that it may freely rotate within housing 122. Conic bearings 165 are mounted by any convenient support members 166 to support shaft 157 rigidly but rotatably between bottom wall 124 and top wall 126.

Nose 147 includes a divider wall 168 which is cylindrical in shape and mounted concentrically of sidewall 148 between end wall 149 and top wall 126. Shaft 157 extends through an associated conic bearings 165 to mount a magnet 170 internally of divider wall 168. A conducting coil 172 is positioned between dividing wall 168 and sidewall 148 so that, as shaft 157 turns to rotate magnet 170, an electric current is generated within coil 172. Similarly, at the opposite end of shaft 157 a second magnet 174 is mounted within nose 150 on shaft 157. To this end, shaft 157 extends though the associated conic bearing 165 to support magnet 174 for free rotatable motion. A cylindrical divider wall 172 is mounted concentrically of sidewall 151 such that magnet 174 is positioned internally of divider wall 172. A conducting coil 175 is positioned between divider wall 172 and sidewall 151, and, as magnet 174 is rotated by shaft 157, an electric current is generated in coil 175. The electricity generated in coils 171 and 175 may then be transmitted in any convenient manner to an electrical output.

Sunlight is directed onto vanes 162 by means of lens 180 and 182 which are positioned in longitudinal openings in housing 122. Sunlight is directed along paths to create a torque on shaft 157 when the sunlight impinges and is absorbed by vanes 162 in a manner similar to that described with respect to the preferred embodiment. However, as is shown in FIG. 9, lens 180 directs sunlight onto a perro prism 184 which reverses the path of light in a manner similar to that with respect to mirror 98. In the embodiment shown in FIG. 9, however, shaft 157 turns in a clockwise direction. It should be appreciated that housing 122 is also air tight so that it may be evacuated to approximately 35 millionths atmosphere of pressure.

The alternate embodiment of present invention includes a self-activated tracking system which follows the path of the sun during the course of a day such that lens 180 and 182 will always be positioned directly toward the sun. The tracking assembly also includes a seasonal adjustment capability so that housing 122 may be tilted so that the incident sunlight will be directed perpendicularly on vanes 162. The seasonal adjustment is provided by means of a screw jack 186 which is positioned between base 136 and the end of the lower arm of arm 188 of L bracket 138. Thus, as screw jack 186 is selectively adjusted, L bracket 138 is pivoted about hinge 144 on post 140. Thus housing 142 is tilted so that lens 180 and 182 are approximately perpendicular to the incident light of the sun.

Figure 8:
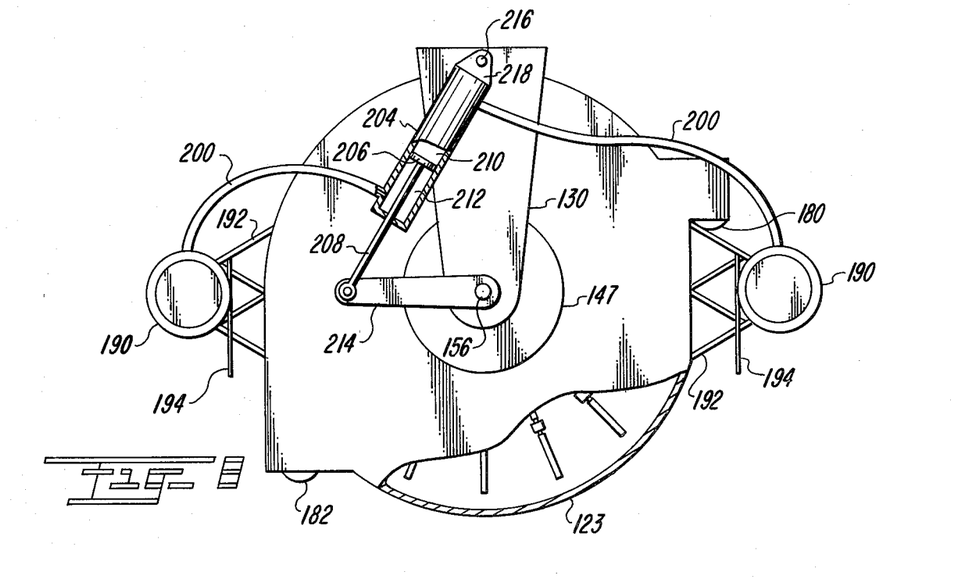
FIG. 8 is a top plan view of the solar electric generator shown in FIG. 7.

The tracking of the sun that occurs during the day is achieved by an automatic hydraulic system which is known in the art. An understanding of this system may be enhanced by a review of the *Mother Earth News*, November/December 1977, pages 110-112. This article discusses a hydraulic system which automatically tracks the sun with this system being applied to a flat plate collector. The solar tracker mechanism utilized in the present invention is similar to that described in this publicaion. As shown in FIGS. 7 and 8, this mechanism comprises a pair of elongated cylinder 190 mounted on opposite sides of solar electric generator 120 parallel to shaft 157. Cylinders 190 are maintained rigidly in position on solar electric generator 120 by means of a framework 192, and are each provided with a screen 194 each mounted perpendicular to the plane defined by the axes of shaft 157 and cylinders 190. Each of is partially filled with a liquid 196 which is preferably oiled freon 12 as shown in FIG. 7. Each cylinder has a lower outlet 198 which is connected to an elongated conduit or tube 200 which extends up over electric generator 120 and is secured to the upper portion of each cylinder 190 by means of a pair of clip brackets 202.

The opposite end of each tube 200 is connected to respective halves of a double piston cylinder 204 as shown in FIG. 8. Piston cylinder 204 is a hydraulic cylinder which contains a piston 206 which divides cylinder 204 into two chambers 210 and 212. When the pressure entering chambers 210 and 212 are equal, which occurs when the temperatures of cylinders 190 are identical, piston 206 will be centered within cylinder 204. A piston rod 208 has one end connected to piston 206 and an opposite end connected to one end of arm 214 which has its other end securely fastened to post 156. Cylinder 204 has one end securely yet pivotally connected to arm 130 by means of a pivot post 216 with pivot post 216 receiving ear 218 which forms an end of cylinder 204. Accordingly, when piston 206 is driven reciprocally within cylinder 204, piston rod 208 is forced inwardly and outwardly of cylinder 204 which, in turn, moves arm 214 to pivot solar electric generator 120 about the axis defined by shaft 157 with this pivotal motion supported by gimbal 154 and bearing 146.

This construction, then, automatically tracks the sun as is described in the above-referenced article. When one of these cylinders receives direct sunlight while the other cylinder is in a shadow, for example, the lighted cylinder is elevated in temperature which increases the pressure therein. To increase the heating, cylinders 190 are coated with an absorptive substance. This pressure differential then results in a pressure differential between chambers 210 and 212 which drives piston 206 in a direction that will pivot solar electric generator 120 in a direction so that it faces the incident radiation. When this occurs, the other cylinder, which was formerly in a shadow, now receives an equivalent amount of sunlight so that the pressures between the two cylinders are matched and piston 206 returns to a central position within cylinder 204. The device then locks on the incident radiation to track the sun throughout its course in the sky as is more fully described in the above-referenced article. To this end, the main body of solar electric generator 120 operates as a shield similar to screens 194 in shielding the desired cylinder from sunlight except when the device is locked on the sun. Screens 194 provide more of a "fine tune" adjustment to the sun's position.

Although the present invention has been described with particularity relative to the foregoing detailed description of the preferred embodiment, various modifications, changes, additions and applications other than those specifically mentioned herein will be readily apparent to those having normal skill in the art without departing from the spirit and scope of this invention.

I claim:

1. A solar electric generator comprising:
   a housing including a transparent window portion;
   first and second bearing members mounted in said housing;
   an elongated shaft rotatably mounted between said first and second bearing members and defining an axis of rotation;
   a propeller rigidly mounted on said shaft in a plane transverse to its axis of rotation, said propeller having a plurality of arms positioned about said shaft and extending in a radially outward direction therefrom;
   a vane member mounted on the end of each said arm, each said vane having first and second face surfaces, said first face surface being coated with a light absorbing material operative to absorb light in the visible spectrum; and
   a generator means associated with said shaft for converting rotational energy of said shaft into electrical energy.

2. A solar electric generator according to claim 1, including a plurality of propellers rigidly mounted on said shaft in planes transverse to its axis of rotation, each said propeller having a plurality of arms positioned equiangularly about said shaft and extending in a radially outward direction therefrom, and including a vane member mounted on the end of each said arm, and each said vane having a first surface coated with a light absorbing material.

3. A solar electric generator according to claim 2, wherein the arms of adjacent propellers are angularly offset from on another.

4. A solar electric generator according to claim 3, wherein four said propellers are mounted on said shaft, each said propeller having four arms and wherein the arms of adjacent propellers are angularly offset 22.5 degrees from one another.

5. A solar electric generator according to claim 1 including tracking means associated with said housing for automatically tracking the daily course of the sun through the sky.

6. A solar electric generator according to claim 5, wherein said tracking means includes an observatory gear and motor assembly.

7. A solar electric generator according to claim 2, wherein said vane members are rotatable about the axis of its associated said arm and said bearings are low-friction conic bearings.

8. A solar electric generator according to claim 7, wherein said arms of said propellers have a plurality of openings formed therein whereby the weight of said propeller arm is reduced and wherein said housing is substantially airtight.

9. A solar electric generator according to claim 2, including a lensing system whereby incident sunlight falling on said window portion is focused into the path of said vane members as they rotate about the axis of said shaft such that the light strikes each said first face of said vanes at angles approximating 90 degrees in a first arced portion of its path about said shaft.

10. A solar electric generator according to claim 9 including a second window portion and said lensing system including optical means forming a second optical path whereby sunlight falling on said second window portion is focused on said first face surface of each said vane member entering said second window portion striking said vanes at angles approximately 90 degrees in a second arced portion of their paths at a position at least 90 degrees angularly offset from the position entering through said first window portion strikes said vanes.

11. A solar electric generator according to claim 10, wherein said lensing system includes a mirror adapted to reflect light entering said second window portion at an angle of at least 145 degrees.

12. A solar electric generator according to claim 1, wherein said generator means includes a magnet mounted on said shaft and a conductive coil surrounding said magnet such that said magnet may rotate within said coil.

13. A solar electric generator according to claim 1, including a vertical tracking means associated with said housing for seasonal tracking of the sun's angle of elevation in the sky, whereby incident sunlight is directed substantially perpendicularly onto said window portion of said housing.

14. A solar electric generator for converting solar energy into electrical energy comprising:
a base member;
a support framework pivotal with respect to said base member about a horizontal axis;
a generally cylindrical housing rotatably mounted to said support framework about the central axis of said housing, said housing having a first longitudinal window;
a shaft member rotatably mounted in said housing along said central axis thereof;
a plurality of propeller members having equiangularly spaced arms extending radially outwardly from said shaft;
a vane member mounted to the outward end of each said arm, each said vane member having a surface coated with a light absorbing material operative to absorb light in the visible spectrum;
generator means mounted on opposite ends of said shaft whereby rotary motion of said shaft is converted into electrical energy; and
automatic tracking means interconnecting said housing and said framework for automatically tracking the daily course of the sun.

15. A solar electric generator according to claim 14 wherein adjacent ones of said propellers are axially offset from one another about said shaft.

16. A solar electric generator according to claim 14 wherein said housing includes a second longitudinal window, each of said windows having associated focusing means for focusing incident sunlight onto said coated surfaces at angles approximately 90 degrees as said vanes travel through arced portions of their path about said central axis as said shaft rotates.

17. A solar electric generator according to claim 16 wherein said tracking means includes first and second cylinders mounted to said housing on opposite sides thereof and a hydraulic cylinder interconnecting said framework and said housing, each said cylinder containing a hydraulic fluid and being in fluid communication with said hydraulic cylinder whereby fluid pressure from said first cylinder drives said hydraulic cylinder in one direction and fluid pressure from said second cylinder drives said hydraulic cylinder in an opposite direction.

18. A solar electric generator according to claim 14 wherein shaft is supported by low-friction conic bearings, said propellers being mounted between said bearings and said shaft having opposite end portions extending axially outwardly from each said bearing, said generator means including a magnet mounted on each said end portion and a pair of conducting coils secured to said housing, each said coil in radially surrounding relation to a respective magnet.

* * * * *